US 6,630,683 B2

(12) United States Patent
Vanvor

(10) Patent No.: US 6,630,683 B2
(45) Date of Patent: Oct. 7, 2003

(54) ANTIRADIATION CONCRETE AND ANTIRADIATION SHELL

(75) Inventor: Dieter Vanvor, Kleinsendelbach (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/790,031

(22) Filed: Feb. 21, 2001

(65) Prior Publication Data

US 2002/0134951 A1 Sep. 26, 2002

Related U.S. Application Data

(63) Continuation of application No. PCT/DE99/02499, filed on Aug. 11, 1999.

(51) Int. Cl.⁷ .......................... G21C 11/00; G21F 3/02; G21F 1/00
(52) U.S. Cl. ................... 250/518.1; 250/505.1; 250/515.1; 250/517.1; 252/478
(58) Field of Search .................. 250/518.1, 515.1, 250/517.2

(56) References Cited

U.S. PATENT DOCUMENTS

| | | | | |
|---|---|---|---|---|
| 4,437,013 A | * | 3/1984 | Hondorp | 250/515.1 |
| 4,610,893 A | * | 9/1986 | Eriksson et al. | 427/446 |
| 4,727,257 A | * | 2/1988 | Grifoni | 250/518.1 |
| 4,833,334 A | * | 5/1989 | Valy et al. | 250/515.1 |
| 4,837,448 A | * | 6/1989 | Sainte Luce Banchelin et al. | 250/519.1 |
| 5,416,333 A | * | 5/1995 | Greenspan | 250/515.1 |
| 2002/0134951 A1 | * | 9/2002 | Vanvor | 250/515.1 |

FOREIGN PATENT DOCUMENTS

| DE | 84 10 248.9 | 8/1984 | | |
|---|---|---|---|---|
| DE | 38 21 684 A1 | 2/1990 | | |
| EP | 0 106 759 A2 | 4/1984 | | |
| EP | 0 232 680 A1 | 8/1987 | | |
| FR | 1.458.833 | 10/1966 | | |
| FR | 0475831 A1 | * | 3/1992 | C04B/14/30 |
| JP | 01081846 A | * | 3/1989 | C08L/61/10 |

OTHER PUBLICATIONS

Finkelstein et al., "Improved radiation Shielding", Cornell Publication, Newsletter 1995, availbale at http://www.chess.cornell.edu/Publications/Newsletter_1995/shielding.html.*
Stark, H.C., "Boron—from eye drops to rocket propellant".*
Eugen Popescu et al.: "Concrete fro protection against nuclear radiation", Chemical Abstracts, 109 (1988) Oct. 30, No. 14, Columbus, Ohio, US.
"Strahlenschutzbetone" [antiradiation concrete], in "Beton" [concrete] vol. 10/78, pp. 368–371.

* cited by examiner

Primary Examiner—John R. Lee
Assistant Examiner—Bernard E. Souw
(74) Attorney, Agent, or Firm—Laurence A. Greenberg; Werner H. Stemer; Ralph E. Locher

(57) ABSTRACT

A first antiradiation concrete includes a metallic aggregate having a grain size of up to 7 mm, and at least 5.0% by weight, in particular at least 7.8%, of a boron-containing aggregate having a grain size of up to 1 mm and being finer-grained than the metallic aggregate. A second antiradiation concrete includes a boron-containing aggregate having a grain size of up to 1 mm, and between 80 and 90% by weight, in particular 85 to 89%, of a metallic aggregate having a grain size of up to 7 mm. For the second concrete, the boron-containing aggregate is between 1.0 and 1.5% by weight. To achieve a shielding action that absorbs as much heat and radiation as possible, an antiradiation shell (2) has a wall region (2a to 2z) formed from the first or second antiradiation concrete where each has a boron-containing aggregate with a grain size up to 1 mm and a metallic aggregate grain size up to 7 mm.

31 Claims, 1 Drawing Sheet

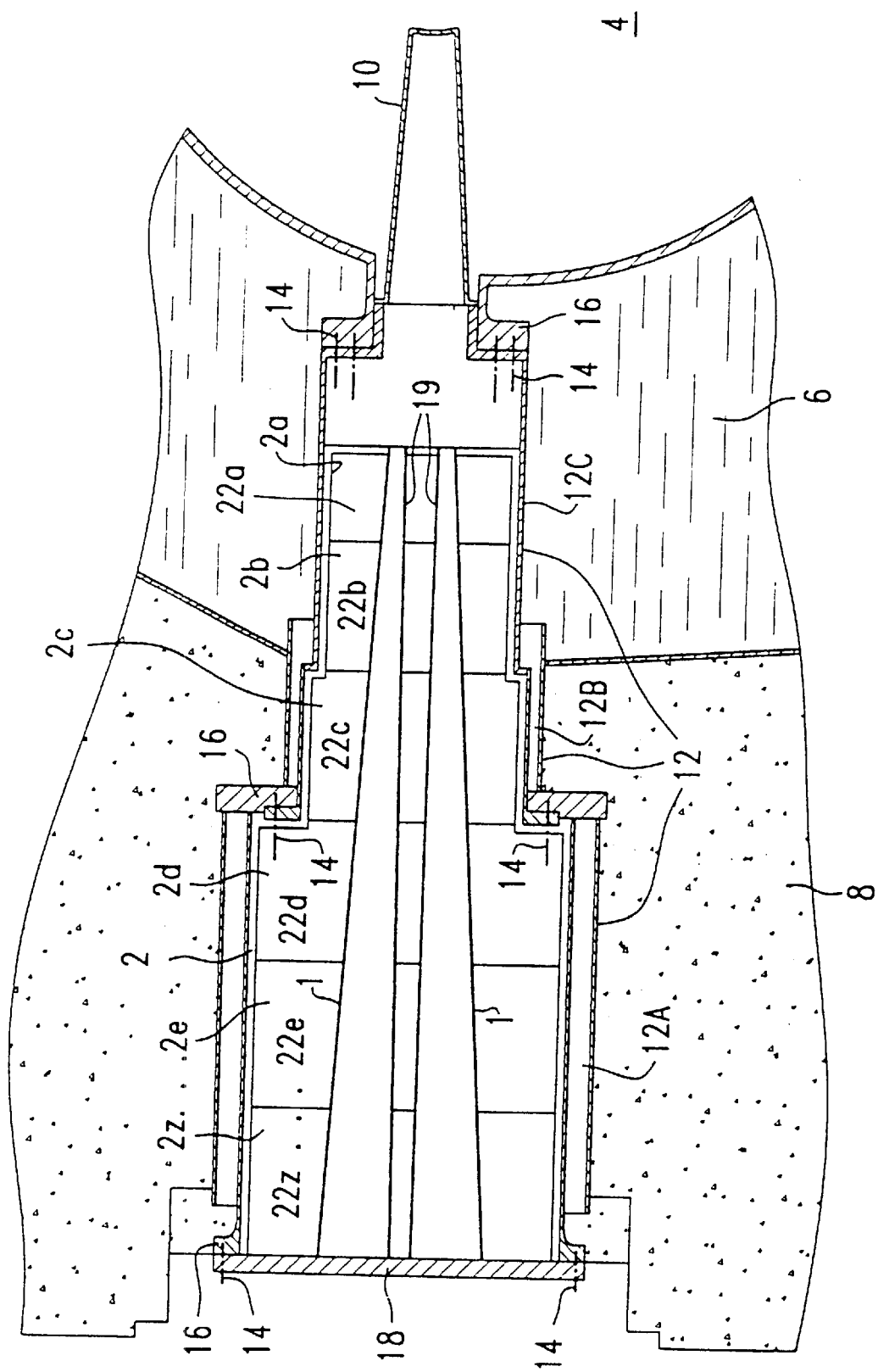

ANTIRADIATION CONCRETE AND ANTIRADIATION SHELL

CROSS-REFERENCE TO RELATED APPLICATION

This application is a continuation of copending International application No. PCT/DE99/02499, filed Aug. 11, 1999, which designated the United States.

BACKGROUND OF THE INVENTION

FIELD OF THE INVENTION

The invention relates to an antiradiation concrete and an antiradiation shell for shielding radiation from a radiation source, in particular, for shielding neutron radiation and gamma radiation.

To shield a radiation source from which ionizing radiation and/or neutron beams are emitted, for example, the radiation in the region of a beam passage of a reactor plant, a spallation neutron source, or the radiation from medical equipment, it is customary to use as shielding materials steel, cast materials, layers of polyethylene, lead, lead alloys, and combinations of these materials. The doping of these materials with neutron poisons, such as, for example, boron, in particular, boron isotope 10, or cadmium makes shielding materials of this nature particularly suitable for shielding neutrons. In these materials, the neutrons are absorbed to a greater or lesser extent depending on the selected neutron poison concentration, e.g., boron concentration, and the neutron energy.

The type, size and output of the radiation source are defining factors in determining the construction, the selection of materials, and the configuration of materials for the shielding. Usually, the overall thickness required for the shielding is determined by the intensity of radiation at the entry to the shield and the desired weakening of the intensity over the thickness of the shield as well as the specific shield efficacy of the shielding materials selected.

With a particularly strong radiation source, e.g., a beam passage in a reactor plant, to be able to provide an effective shell protecting against the emission of heat, neutron radiation, and gamma radiation, the shield usually has a particularly great volume due to the required high overall thickness. Furthermore, in reactor plants or spallation neutron sources, the protective shell or the protective barrier is divided into a plurality or regions or layers of different types of materials. For example, the reactor core is cooled and shielded by continuously cooled water as a first layer of the protective shell. The first layer is usually adjoined by a second layer of solids, preferably concrete with a relatively high density. Consequently, the individual solid layers of the protective shell have to be able to withstand the corrosive influence of both water in liquid form and water in vapor form. For such a purpose, the solid material selected as shielding material is predominantly encased or encapsulated with refined metals. Such encapsulation is particularly complex in terms of construction and assembly.

A further disadvantage is that, due to the solid shielding materials, cavities that are caused by a complex structure of the radiation source cannot be utilized or cannot fully be utilized for shielding. Thus, the dimensions are particularly voluminous due to the shielding effect that is to be achieved and is laid down by statutory provisions, and such a protective shell involves a particularly high level of outlay.

A specialist article in the journal "Beton" [Concrete] 10/78, pages 368 to 371, entitled "Strahlenschutzbetone—Merkblatt für das Entwerfen, Herstellen und Prüfen von Betonen des bautechnischen Strahlenschutzes" [Antiradiation concretes—instruction sheet for designing, producing and testing concretes used in radiation protection in the construction industry], discusses adding boron-containing substances to a concrete as aggregates. Examples of such boron-containing substances are colemanite, boron calcite, boron frit, and boron carbide. Moreover, the article describes heavy metallic additions such as, for example, iron granules or steel grit.

Hitherto, it has been assumed that the boron-containing aggregates on one hand and the heavy metallic additions on the other hand can only be added to the concrete in very small proportions, without, for example, having an adverse effect on the setting of the concrete. Also according to the article, the antiradiation concretes described therein could also only be used to produce an antiradiation shell of large dimensions.

SUMMARY OF THE INVENTION

It is accordingly an object of the invention to provide an antiradiation concrete and antiradiation shell that overcomes the hereinafore-mentioned disadvantages of the heretofore-known devices of this general type and that provides an antiradiation concrete that, while maintaining a shielding action absorbing as much radiation as possible, can be used to produce an anti-radiation shell with a particularly small volume. It is intended for the small volume to be achieved with a particularly high installation flexibility in combination with particularly low procurement and production costs. For such purposes, the invention is also intended to specify an antiradiation shell.

With the foregoing and other objects in view, there is provided, in accordance with the invention, an antiradiation concrete, including a metallic aggregate having a grain size of up to 7 mm, and at least 5.0% by weight of a boron-containing aggregate having a grain size of up to 1 mm and being finer-grained than the metallic aggregate.

According to a first embodiment of the invention, the antiradiation concrete has a first boron-containing aggregate with a grain size of up to 1 mm at least 5.0% by weight, in particular, at least 7.8% by weight, and a second metallic aggregate with a grain size of up to 7 mm. The antiradiation concrete of the first embodiment is particularly suitable for shielding strong neutron radiation.

With the objects of the invention in view, there is also provided an antiradiation concrete, including a boron-containing aggregate having a grain size of up to 1 mm, and between 80 and 90% by weight of a metallic aggregate having a grain size of up to 7 mm.

According to a second embodiment of the invention, the antiradiation concrete has a first boron-containing aggregate with a grain size of up to 1 mm and between 80 and 90% by weight of a second metallic aggregate with a grain size of up to 7 mm. In the antiradiation concrete of the second embodiment, the first boron-containing aggregate is preferably present in a proportion or content of between 1.0 and 1.5% by weight. The proportion of the second metallic aggregate is preferably in the range from 85 to 89% by weight. The second embodiment of antiradiation concrete is particularly suitable for shielding strong gamma radiation.

Contrary to expectations, and to the surprise of the specialists in the field of the art, tests have shown that both embodiments of the antiradiation concrete can be produced and used on an industrial scale despite the high content of the first boron-containing aggregate or the high content of the second metallic aggregate.

In accordance with another feature of the invention, the antiradiation concrete according to the invention is particularly suitable for the production of an antiradiation shell in which a wall region is formed from the antiradiation concrete of at least one of the two embodiments.

In accordance with a further feature of the invention, the antiradiation shell is used for shielding a radiation source in an X-ray device, in a room having a radiation source, or in a beam tube in a reactor plant.

The invention is based on a consideration that, to achieve a particularly high shielding action with a minimal volume, the shielding material or antiradiation material that is used should be capable of filling even complicated cavities and, thus, of achieving a shielding action even in the immediate vicinity of the radiation source. The formulation of the shielding material should be such that it can be acted on directly by radiation. In other words, the shielding should be particularly able to withstand temperature and radiation, so that it can also be used directly at the radiation source and, therefore, under extreme environmental conditions. Furthermore, the self-activation potential, which is determined by the formulation of the shielding material, should also be taken into account. Self-activation potential means that, because of high gamma radiation, constituents of the aggregates may become activated and may even themselves become radiating substances, if they are irradiated for sufficiently long periods.

Based on the above, the antiradiation shell is formed from a concrete that, due to its chemical composition and grain size used for the chemicals employed, achieves a desired high shielding action and low self-activation potential. With regard to the desired shielding action, the ratio of the gamma radiation proportion to the neutron radiation proportion in the total radiation intensity from the radiation source is the defining factor. The higher the gamma radiation proportion, the higher the bulk density of the concrete in the set state in accordance with DIN 1045 is to be selected. In the second embodiment the density is achieved by a high proportion of the second metallic aggregate, which influences the density of the concrete used as shielding material. By contrast, for a high proportion of neutron radiation, in the first embodiment the proportion of the first boron-containing aggregate, which acts as neutron poison, is selected to be particularly high. In such a case, it is advantageously possible to set a minimum bulk density of approximately 3000 kg/m$^3$ because otherwise secondary gamma radiation may arise when neutron radiation is absorbed.

In accordance with an added feature of the invention, the boron-containing aggregate is a boron-containing mineral, particularly, colemanite.

In accordance with an additional feature of the invention, the metallic aggregate is granulated iron or granulated steel.

In accordance with yet another feature of the invention, the antiradiation concrete has a minimum bulk density of approximately 3000 kg/m$^3$ and preferably has a bulk density of approximately 6000 kg/m$^3$.

In accordance with yet a further feature of the invention, there is provided another metallic aggregate having a grain size of up to 1 mm, preferably, barite sand.

In accordance with a concomitant feature of the invention, there is provided a mineral-containing aggregate with a grain size of up to 7 mm, preferably, serpentine.

To achieve the desired bulk density, the antiradiation concretes of the first and second embodiments are advantageously concrete mixtures having, as the basic elements, a cement with a high water of crystallization content and water (so-called mixing water), the first boron-containing aggregate as so-called neutron poison, and the second metallic aggregate.

To further increase the bulk density or to increase the content of water of crystallization, a third metallic aggregate, and/or a fourth mineral aggregate should preferably be added to the antiradiation concretes according to the invention.

Furthermore, a flux and/or a retardant are expediently provided as auxiliaries. The addition of fluxes and retardants improves the processability of the concrete mixture, in particular, above a bulk density of approx. 4000 kg/m$^3$.

Such concrete takes up scarcely any water, so that there is virtually no corrosion of the metallic aggregates. Furthermore, the addition of the fourth mineral aggregate, preferably serpentine, ensures that the water supplied during production of the concrete is not released even at elevated temperatures. Rather, a large proportion of the water is bound in the concrete mixture in the form of water of crystallization. Serpentine is distinguished by its particularly good binding property for a particularly large quantity of water in the form of water of crystallization. Such binding leads to an improved resistance to corrosion compared to standard concrete, combined, at the same time, with particularly good processing and production properties. These in turn make it possible to produce shielding bodies in any desired form. These shielding bodies or concrete blocks form the antiradiation shell in the desired number and layered construction.

Due to its high capture cross section for neutrons (in particular thermal neutrons), the boron serves primarily as a neutron absorber and is heated accordingly. However, boron is very light, less thermally conductive, and less able to absorb gamma radiation than many other materials. Nonetheless, metals that often have a reflective effect on neutron radiation are used as a second aggregate. Therefore, the absorption, moderation, and reflection of the neutron radiation can be set according to the particular requirements using the quantitative ratios of the aggregates, while at the same time the required density, heat dissipation and gamma absorption are also achieved.

A suitable bulk density is achieved by the combination of the selected aggregates and a suitable selection of their grain size. The particular grain size of the aggregates may be selected such that the concrete, in terms of the processing and the properties to be achieved, such as, for example, moderation and absorption, exhibits the maximum possible flexibility of installation and the most effective shielding action possible. For such a purpose, the aggregates preferably have both fine-grained and coarse-grained fractions. It has proved particularly advantageous for the first boron-containing aggregate to be more fine-grained than the second metallic aggregate, with the fine-grained first aggregate having a mean grain diameter of approx. 1 mm and the coarse-grained second aggregate having a mean grain diameter of approx. 7 mm.

For various applications of the antiradiation shell according to the invention, it has proven appropriate to consider two extreme situations in terms of the type of radiation:

a) predominantly neutron radiation with a residual proportion of gamma radiation, also taking into account the secondary gamma radiation produced; and b) predominantly gamma radiation with residual proportions of neutron radiation.

For situation a), the desired shielding action is preferably achieved with the highest possible proportion of neutron poison in the shielding concrete. The shielding concrete should also have a minimum density in order to shield the secondary gamma radiation. For situation a), the first embodiment of the antiradiation concrete is particularly suitable.

For situation b), the desired shielding of gamma radiation is preferably achieved by the highest possible bulk density of the concrete (shielding concrete). The concrete should also have a minimum level of a neutron poison in order to shield the residual neutron radiation. The second embodiment of the antiradiation concrete is preferred for such a purpose.

The corresponding wall region formed from one of the concretes may, in the manner of a layer structure, be combined with other shielding layers, each of which having a different concrete mixture, of the antiradiation shell. In such a case, the individual shielding layers each differ in the shielding action achieved according to their composition. For example, to obtain increased protection against neutrons with a longer range, it is possible to provide shielding layers that, compared to the wall region, have a lower bulk density and a higher proportion of boron.

To shield, in particular, to absorb, the neutron radiation emanating from the radiation source, the boron in the first aggregate is advantageously used in the form of a boron-containing mineral, in particular, colemanite, which contains boric oxide. The level of boron in the first aggregate is at least 20% by weight, preferably between 30 and 50% by weight (calculated as boric oxide). Consequently, the addition of colemanite (a naturally occurring mineral) with a boric oxide level of up to 41% by weight leads to a particularly high absorption property for thermal neutrons of the antiradiation shell.

To achieve a particularly high bulk density of the concrete, granulated iron or granulated steel is expediently provided as the second metallic aggregate. The use of granulated steel with a bulk density of up to 7850 kg/m$^3$ as a coarse-grained material with a grain size of from 0.3 mm to 7 mm is the decisive factor in determining the bulk density of the concrete produced. Furthermore, the selected grain size makes the concrete particularly simple to produce and process, even for an antiradiation shell of relatively small dimensions.

To achieve particularly good binding of the granulated iron or steel in the concrete and, furthermore, to achieve a particularly high compressive and splitting tensile strength, a third aggregate, in particular, barite sand, is preferably provided, which preferably has a grain size of up to 1 mm and is, consequently, particularly fine-grained. A required compressive and splitting tensile strength can be set by the controlled addition of barite sand, enabling the concrete to be used both in load-bearing regions of concrete structures and in statically loaded concrete blocks.

For extreme situation a), i.e., for particularly high shielding of neutron beams, the wall region of the antiradiation shell is preferably formed from the first embodiment of the antiradiation concrete. Such antiradiation concrete is, in particular, a first concrete having a minimum cement content of between 8 and 9% by weight, a minimum water content (mixing water) of between 4.5 and 6.5% by weight, a minimum first aggregate (colemanite) content of at least 7.8% by weight up to the same proportion as the proportion of cement selected, a minimum second aggregate (granulated iron or steel) content of between 30 and 35% by weight, and a minimum fourth mineral-containing aggregate (serpentine) content of between 40 and 50% by weight. Auxiliary substances are not required in this first concrete mix. The percentage by weight data relate to the weighed-in quantity minus the water that can be expelled at 800° C.

Because of the binding of the mixing water in the form of water of crystallization, the particularly high water content in the first concrete leads to a particularly high slowing-down of neutron radiation. Furthermore, the level of colemanite makes the slowing-down of neutron radiation more intensive. In other words, the higher the colemanite and water levels, the more satisfactorily the first concrete fulfills its shielding function with respect to neutron radiation.

The first concrete or one of the two embodiments of the antiradiation concrete advantageously has a bulk density of approximately 3000 kg/m$^3$. The specified minimum bulk density is achieved, in particular, by using granulated iron or steel with a specified grain size as a second aggregate. In addition, the bulk density achieved provides sufficient shielding with respect to the gamma radiation. The addition of the fourth aggregate—serpentine—significantly increases the water of crystallization content of the concrete mixture and improves the binding within the concrete such that the concrete has a particularly high compressive and splitting tensile strength. Due to the particularly high proportion of serpentine, the first concrete is referred to below as "serpentine concrete".

To keep the proportion of water in the aggregates for the serpentine concrete low, the third aggregate preferably has a grain size of up to 7 mm. In such a case, it has proven particularly advantageous if the third aggregate is admixed with two different grain sizes. The minimum content of the third aggregate with a first grain size of up to 3 mm is advantageously between 12 and 16% by weight. The minimum content with a second grain size of between 3 and 7 mm is between 28 and 34% by weight. The information about the grain size is based on the geometric mean as is established in the bulk material when minerals are comminuted or during the corresponding production process. In particular, however, the specified upper limit can be set using the mesh width of a corresponding sieve.

For extreme situation b), i.e., for high absorption of the gamma radiation by the antiradiation shell, the wall region is preferably formed from the second embodiment of the antiradiation concrete. Such antiradiation concrete is, in particular, a second concrete having a minimum cement content of between 4 and 4.5% by weight, a minimum water content of between 1.5 and 2.5% by weight, a minimum first aggregate (colemanite) content of between 1 and 1.5% by weight, a minimum second aggregate (granulated iron or steel) content of between 85 and 89% by weight, a minimum third aggregate (barite sand) content of between 4.5 and 5% by weight, and a minimum content of at least one auxiliary of from 0.1 to 0.15% by weight. The percentage by weight data relate to the weighed-in quantity minus the water in the concrete that can be expelled at 80° C.

The second concrete or one of the two embodiments of the antiradiation concrete advantageously has a bulk density of approximately 6000 kg/m$^3$. A particularly high bulk density is achieved, in particular, using granulated steel with a specific grain size as second aggregate, which forms the principal constituent of the concrete. The high bulk density, in turn, provides particularly high shielding of the gamma radiation that is generated. The binding of the water (mixing water) in the form, for example, of water of crystallization (as well as the levels of water of crystallization already contained in the raw materials) in the serpentine in this case also slows down (moderates) the neutron radiation. Furthermore, the concrete has a good absorption property for neutron radiation due to the proportion of colemanite.

The addition of the third aggregate (barite sand) improves the binding within the concrete such that it achieves particularly good compressive and splitting tensile strengths. For particularly rapid and simple processing of the concrete, a flux and/or a retardant are preferably provided as auxiliaries. The addition of these auxiliaries is dependent on the quantity of colemanite added, which has a particularly great influence on the processability of the second concrete. The second concrete, which contains granulated iron or steel as its principal constituent for extreme situation b), is referred to as "granulated steel concrete".

When selecting the concrete in terms of the minimum contents of its constituents, a wide range of different properties that are to be achieved, together with their different influences, are to be taken into account. Such properties include, for example, the type of radiation to be shielded, the dose rate ahead of and after the shielding or the antiradiation shell, the neutron radiation proportion and its energy level, long-term corrosion under conditions of a particularly strong radiation source, etc. In order, for example, to combine particularly good shielding of neutron beams with good protection against gamma rays, it is possible for a plurality of different compositions of the concrete, in particular, a plurality of shielding layers each made from a concrete that contains different quantitative proportions of the aggregates, to be combined.

In a particularly advantageous configuration, at least a part of the antiradiation shell includes a first layer with the first concrete (serpentine concrete), and a second layer with the second concrete (granulated steel concrete). Such a two-layer antiradiation shell ensures that, by suitable selection of the thickness of the respective layer or by having a specific number of layers, minimum and maximum limits for the radiation that still remains after these layers are satisfied. Such a configuration permits compliance with safety requirements with regard to the radiation exposure of people and machines.

An antiradiation shell constructed from concrete in such a way is particularly, advantageously suitable for the indirect and/or direct shielding of a radiation source, an X-ray device, a room containing a radiation source, or a beam passage in a reactor plant. For example, the antiradiation shell is suitable both for direct shielding of a radiation source, in the form of formwork, and for indirect shielding of a radiation source in a room, in the form of a wall or a floor.

Other features that are considered as characteristic for the invention are set forth in the appended claims.

Although the invention is illustrated and described herein as embodied in an antiradiation concrete and antiradiation shell, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The FIGURE is a diagrammatic, fragmentary, cross-sectional view of an antiradiation shell for the direct shielding of a radiation source according to the invention.

DESCRIPTION OF THE PREFERRED EMBODIMENTS

Referring now to the single FIGURE of the drawing, it is seen that an antiradiation shell 2 disposed around two beam passages 1 is part of a radiation source that is not shown in more detail, for example, a reactor core in a nuclear power plant. The two beam passages 1 are, for example, part of a measurement configuration in the monitoring region of a reactor plant or nuclear power plant. To shield the non-illustrated reactor core (radiation source), the latter is disposed in a tank 4. The configuration of the tank 4 is dependent on the configuration of the plant. The tank 4 is adjoined by the reactor well 6. Depending on the type of plant, the tank 4 and the reactor well 6 may also form a single unit. The reactor well 6 is delimited by a reactor well wall 8.

For the controlled removal and guidance of the radiation emanating from the reactor core, the two beam passages 1 are disposed in the antiradiation shell 2. The antiradiation shell 2 is disposed in a fuel sheath 12, including a liner tube 12A, a cladding tube 12B, and a compensator tube 12C, between the tank 4 and the outer wall of the reactor well wall 8. The cavity to be filled up by the antiradiation shell 2 is delimited by the inner walls of the liner tube 12A, the cladding tube 12B, the compensator tube 12C, and the inner side of a beam tube projection 10 that is led into the tank 4. These components or structural elements are attached, e.g., bolted, to the corresponding support 16 by attachment elements 14.

To avoid continuous gaps, the fuel sheath 12 is stepped a number of times in the axial direction. For such a purpose, the tubes that form the fuel sheath 12—namely the liner tube 12A, the cladding tube 12B, and the compensator tube 12C—have, for example, a correspondingly decreasing diameter. The fuel sheath 12, which is also referred to as the cladding tube, may be one element, e.g., a cast element, or a plurality of tubes or partial elements.

After the antiradiation shell 2 has been installed in the fuel sheath 12, the fuel sheath 12 is closed on the side of the liner tube 12A by a closure plate 18.

To shield the (laterally scattering) neutron radiation and gamma radiation emerging from the two beam passages 1, the two beam passages 1 are completely enclosed in cross section by a metal shell 19. The metal shell 19 is preferably formed from a stainless ferritic material and causes the minimum possible self-activation of the antiradiation shell 2 that follows it in cross section. Furthermore, the static and dynamic loads on the antiradiation shell 2 determines the thickness of the metal shell 19.

To achieve different shielding properties of the antiradiation shell 2, the antiradiation shell 2 is divided into a number of wall regions $2a$ to $2z$ which each completely enclose the two beam passages 1 and are each formed from an antiradiation concrete or concrete $22a$ to $22z$ that contains different quantitative proportions of aggregates and, therefore, has different bulk densities.

The thickness of the wall region $2a$ to $2z$ is determined by the respective diameter of the individual elements of the fuel sheath 12. Both the number and thickness and also the chemical composition and the bulk density of the wall regions $2a$ to $2z$ are determined by the prior dimensioning according to requirements. Therefore, the concretes $22a$ to $22z$ forming the wall regions $2a$ to $2z$ may vary.

The concrete $22a$ to $22z$ associated with a respective wall region $2a$ to $2z$ has, depending on the desired requirements, corresponding proportions of a first boron-containing aggregate with a grain size of up to 1 mm and of a second metallic aggregate with a grain size of up to 7 mm. A boron-containing mineral, for example, colemanite, is provided as the first fine-grained aggregate. Granulated iron or granulated steel is preferably provided as the second aggregate, which is referred to as coarse-grained on account of its grain size.

The proportions of the first and second aggregates in the concrete 22a to 22z are decisively determined by the shielding properties to be achieved, in particular, gamma absorption and absorption and moderation of neutrons, by the antiradiation shell 2 in the associated wall region 2a to 2z. To achieve particularly high absorption and moderation of neutrons, the concrete 22a that forms the wall region 2a disposed closest to the radiation source, namely the reactor core, on account of its high level of the first mineral-containing aggregate—colemanite—is primarily suitable for the absorption of neutron radiation.

For such a purpose, the first concrete 22a has a minimum cement content of between 8 and 9% by weight, a minimum water content (mixing water) of between 4.5 and 6.5% by weight, a minimum first aggregate (colemanite) content of 7.8% by weight up to the same proportion by weight as cement, a minimum second aggregate (granulated iron or steel) content of between 30 and 35% by weight and a minimum fourth mineral-containing aggregate (serpentine) content of between 40 and 50% by weight. Due to the low proportion of the second aggregate—granulated iron or steel—the concrete 22a is only secondarily suitable for the absorption of the gamma radiation. In the set state, the first concrete 22a has a minimum bulk density of up to 3000 kg/m$^3$.

To improve the binding within the first concrete 22a and to significantly increase the water of crystallization content, serpentine is used as a fourth mineral-containing aggregate. For advantageous mixing of the first concrete 22a, it has proven expedient for the minimum serpentine content with a first grain size of up to 3 mm to lie between 12 and 16% by weight. For the second grain size of between 3 and 7 mm, the minimum content is between 28 and 34% by weight. The first concrete 22a, which has serpentine as its principal constituent, is referred to as serpentine concrete and has particularly high compressive and splitting tensile strength.

For particularly good shielding of a considerable part of the gamma radiation formed, the wall region 2b that is disposed as the second layer, as seen from the radiation source, is formed from a second concrete 22b having a different chemical composition from the first concrete 22a.

The second concrete 22b that forms the second wall region 2b preferably has a minimum cement content of between 4 and 4.5% by weight, a minimum water content (mixing water) of between 1.5 and 2.5% by weight, a minimum first aggregate (colemanite) content of between 1 and 1.5% by weight, a minimum second aggregate (granulated iron or steel) content of between 85 and 89% by weight, a minimum third, in particular, metallic, aggregate (barite sand) content of between 4.5 and 5% by weight and a minimum content of at least one auxiliary of from 0.1 to 0.15% by weight. Due to the composition of the second concrete 22b, the second concrete 22b is preferably suitable for particularly high shielding of the gamma radiation and for lower absorption and moderation the neutron radiation emanating from the radiation source, due to the colemanite proportion, as compared to the first concrete 22a.

Due to the grain structure of the first and second aggregate, to achieve particularly good binding of the second concrete 22b, barite sand with a grain size of up to 1 mm is expediently provided as third aggregate. To improve and accelerate the setting process and, therefore, the ease of production of the second concrete 22b, a flux or a retarding substance is provided as auxiliary. A second concrete 22b of this type, which is formed from the abovementioned proportions of cement, water, aggregates and auxiliaries, in the set state has a bulk density of up to 6000 kg/m$^3$. This bulk density is decisively responsible for the particularly high shielding of the gamma radiation.

Furthermore, in order to achieve particularly high binding of the water content as water of crystallization in the second concrete 22b, the cement used is, in particular, alumina cement based on calcium aluminate. The water of crystallization effects particularly good slowing-down of the neutron radiation. The addition of colemanite with a boric oxide content of up to 41% by mass likewise results in particularly high absorption of thermal neutrons.

The two-layer configuration has proven particularly advantageous because, in this way, the neutrons that emerge at high speed from the radiation source and do not enter the two beam passages 1 are particularly well moderated and absorbed in the first wall region 2a of the antiradiation shell 2 due to the high proportion of colemanite in the first concrete 22a. Furthermore, shielding of a considerable proportion of gamma radiation is already achieved in accordance with the bulk density that characterizes the first concrete 22a. In the second wall region 2b, predominantly gamma radiation is shielded on account of the greater proportion of granulated steel or iron compared to the first concrete 22a, while the neutrons emerging laterally from the beam passages 1 due to scatter radiation are moderated and absorbed in a similar way to the first concrete 22a because of the proportion of the first aggregate (colemanite).

Further wall regions 2c to 2z may be filled with further suitably selected concrete 22c to 22z depending on the nature and intensity of the radiation source. The concrete associated with the respective wall region 2a to 2z has particular shielding properties or actions depending on the respectively selected proportions of the raw materials of the concrete. For example, by changing the proportion of granulated iron or steel it is possible to adjust the bulk density of the concrete 22a to 22z. Furthermore, the proportion of boron in the respective concrete 22a to 22z can be adjusted by changing the proportion of colemanite.

Furthermore, the use of concrete 22a to 22z for certain layers or wall regions 2a to 2z of the antiradiation shell 2 allows the radiation source to be completely enclosed and, therefore, allows a particularly high shielding action for the radiation source, even with difficult and complex geometry or configurations. In particular, the concrete 22a to 22z allows even cavities to be closed off as a result of being introduced into formwork, for example, into the fuel sheath 12. Alternatively, the wall region 2a of the antiradiation shell 2 may be constructed as a shell, a wall, or a floor of a room or a building in which, for example, there is an X-ray device or another radiation source.

The table provided below details the particularly advantageous minimum and maximum limits for the constituents that are important for the two extreme situations a) and b) described above, and for the shielding properties of the first concrete 22a (serpentine concrete) and second concrete 22b (granulated steel concrete) that can be achieved in these cases. The minimum and maximum limits for the grain size of the granulated constituents that have been found to be particularly advantageous for particularly simple production and processing of the two concretes 22a and 22b are also given in the table. Other mixing ratios between the two concrete mixtures are also possible.

Because of the highly effective radiation shielding provided by the respective composition of the concretes 22a and 22b to 22z, the antiradiation shell 2 has a particularly good performance both in terms of self-activation and thermal influences and in terms of absorption and moderation of neutrons and shielding of gamma radiation.

Therefore, the antiradiation shell 2 is particularly suitable for direct use at radiation sources, e.g., in beam tubes of research devices, on the primary circuit of a reactor plant, etc. Furthermore, the antiradiation shell 2 may, on one hand, have a large-area and single-layer configuration, for example, in the form of walls, floors, and ceilings. on the other hand, the antiradiation shell 2 may be made of a plurality of layers or wall regions 2a to 2z each having different shielding properties. Furthermore, the particularly radiation-shielding construction of the antiradiation shell 2 eliminates significant exposure of the operating staff to radiation.

TABLE

| | First concrete 22a (serpentine concrete) | | Mixing ratios | Second concrete 22b (granulated steel concrete) | | Grain size in mm | |
|---|---|---|---|---|---|---|---|
| | Min. % by weight | Max. % by weight | < – > | Min. % by weight | Max. % by weight | Min. | Max. |
| Cement | 8 | 9 | < – > | 4 | 4.5 | — | — |
| Water (mixing water) | 4.5 | 6.5 | < – > | 1.5 | 2.5 | — | — |
| First aggregate (colemanite) | 7.8 | same as cement | < – > | 1 | 1.5 | 0 | 1 |
| Second aggregate (granulated iron or steel) | 30 | 35 | < – > | 85 | 89 | 0 | 7 |
| Third aggregate (barite sand) | — | — | < – > | 4.5 | 5 | 0 | 1 |
| Fourth aggregate | 12 | 16 | < – > | — | — | 0 | 3 |
| | 28 | 34 | | | | 3 | 7 |
| (serpentine) | 40 | 50 | | | | | |
| Auxiliary | — | — | < – > | 0.1 | 0.15 | — | — |

I claim:

1. An antiradiation concrete, comprising:
   a metallic aggregate having a grain size of up to 7 mm; and
   at least 5.0% by weight of a boron-containing aggregate having a grain size of up to 1 mm and being finer-grained than said metallic aggregate;
   said metallic aggregate being larger than said boron-containing aggregate.

2. The antiradiation concrete according to claim 1, wherein said boron-containing aggregate is at least 7.8% by weight of the antiradiation concrete.

3. An antiradiation concrete, comprising:
   a boron-containing aggregate having a grain size of up to 1 mm; and
   between 80 and 90% by weight of a metallic aggregate having a grain size of up to 7 mm, said metallic aggregate being larger than said boron-containing aggregate.

4. The antiradiation concrete according to claim 3, wherein said boron-containing aggregate is between 1.0 and 1.5% by weight of the antiradiation concrete.

5. The antiradiation concrete according to claim 3, wherein said metallic aggregate is between 85 and 89% by weight of the antiradiation concrete.

6. The antiradiation concrete according to claim 1, wherein said boron-containing aggregate is a boron-containing mineral.

7. The antiradiation concrete according to claim 6, wherein said boron-containing mineral is colemanite.

8. The antiradiation concrete according to claim 3, wherein said boron-containing aggregate is a boron-containing mineral.

9. The antiradiation concrete according to claim 8, wherein said boron-containing mineral is colemanite.

10. The antiradiation concrete according to claim 1, wherein said metallic aggregate is at least one of granulated iron and granulated steel.

11. The antiradiation concrete according to claim 3, wherein said metallic aggregate is at least one of granulated iron and granulated steel.

12. The antiradiation concrete according to claim 1, wherein the antiradiation concrete has a minimum bulk density of approximately 3000 kg/m$^3$.

13. The antiradiation concrete according to claim 3, wherein the antiradiation concrete has a minimum bulk density of approximately 3000 kg/m$^3$.

14. The antiradiation concrete according to claim 1, wherein the antiradiation concrete has a bulk density of approximately 6000 kg/m$^3$.

15. The antiradiation concrete according to claim 3, wherein the antiradiation concrete has a bulk density of approximately 6000 kg/m$^3$.

16. The antiradiation concrete according to claim 1, including another metallic aggregate having a grain size of up to 1 mm.

17. The antiradiation concrete according to claim 16, wherein said another metallic aggregate is barite sand.

18. The antiradiation concrete according to claim 3, including another metallic aggregate having a grain size of up to 1 mm.

19. The antiradiation concrete according to claim 18, wherein said another metallic aggregate is barite sand.

20. The antiradiation concrete according to claim 1, including a mineral-containing aggregate with a grain size of up to 7 mm.

21. The antiradiation concrete according to claim 20, wherein said mineral-containing aggregate is serpentine.

22. The antiradiation concrete according to claim 3, including a mineral-containing aggregate with a grain size of up to 7 mm.

23. The antiradiation concrete according to claim 22, wherein said mineral-containing aggregate is serpentine.

24. An antiradiation shell, comprising:
at least one wall region made from an antiradiation concrete including:
a metallic aggregate having a grain size of up to 7 mm; and
at least 5.0% by weight of a boron-containing aggregate having a grain size of up to 1 mm and being finer-grained than said metallic aggregate;
said metallic aggregate being larger than said boron-containing aggregate.

25. An antiradiation shell, comprising:
at least one wall region made from an antiradiation concrete including:
a boron-containing aggregate having a grain size of up to 1 mm; and
between 80 and 90% by weight of a metallic aggregate having a grain size of up to 7 mm;
said metallic aggregate being larger than said boron-containing aggregate.

26. In an X-ray device, an antiradiation shell for shielding a radiation source, comprising:
at least one wall region made from an antiradiation concrete including:
a metallic aggregate having a grain size of up to 7 mm; and
at least 5.0% by weight of a boron-containing aggregate having a grain size of up to 1 mm and being finer-grained than said metallic aggregate;
said metallic aggregate being larger than said boron-containing aggregate.

27. In a room having a radiation source, an antiradiation shell for shielding a radiation source, comprising:
at least one wall region made from an antiradiation concrete including:
a metallic aggregate having a grain size of up to 7 mm; and
at least 5.0% by weight of a boron-containing aggregate having a grain size of up to 1 mm and being finer-grained than said metallic aggregate;
said metallic aggregate being larger than said boron-containing aggregate.

28. In a beam tube in a reactor plant, an antiradiation shell for shielding a radiation source, comprising:
at least one wall region made from an antiradiation concrete including:
a metallic aggregate having a grain size of up to 7 mm; and
at least 5.0% by weight of a boron-containing aggregate having a grain size of up to 1 mm and being finer-grained than said metallic aggregate;
said metallic aggregate being larger than said boron-containing aggregate.

29. In an X-ray device, an antiradiation shell for shielding a radiation source, comprising:
at least one wall region made from an antiradiation concrete including:
a boron-containing aggregate having a grain size of up to 1 mm; and
between 80 and 90% by weight of a metallic aggregate having a grain size of up to 7 mm;
said metallic aggregate being larger than said boron-containing aggregate.

30. In a room having a radiation source, an antiradiation shell for shielding a radiation source, comprising:
at least one wall region made from an antiradiation concrete including:
a boron-containing aggregate having a grain size of up to 1 mm; and
between 80 and 90% by weight of a metallic aggregate having a grain size of up to 7 mm;
said metallic aggregate being larger than said boron-containing aggregate.

31. In a beam tube in a reactor plant, an antiradiation shell for shielding a radiation source, comprising:
at least one wall region made from an antiradiation concrete including:
a boron-containing aggregate having a grain size of up to 1 mm; and
between 80 and 90% by weight of a metallic aggregate having a grain size of up to 1 mm;
said metallic aggregate being larger than said boron-containing aggregate.

* * * * *

UNITED STATES PATENT AND TRADEMARK OFFICE
CERTIFICATE OF CORRECTION

PATENT NO. : 6,630,683 B2
DATED : October 7, 2003
INVENTOR(S) : Dieter Vanvor

It is certified that error appears in the above-identified patent and that said Letters Patent is hereby corrected as shown below:

<u>Title page,</u>
Item [30], should read as follows:
-- Aug. 21, 1998    (DE)    ………. 198 38 134.4 --

Signed and Sealed this

Thirteenth Day of January, 2004

JON W. DUDAS
*Acting Director of the United States Patent and Trademark Office*